United States Patent
Matsumoto et al.

(10) Patent No.: US 12,449,796 B2
(45) Date of Patent: Oct. 21, 2025

(54) TEACHING DEVICE AND NON-TRANSITORY COMPUTER-READABLE MEDIUM STORING A COMPUTER PROGRAM

(71) Applicant: FANUC CORPORATION, Yamanashi (JP)

(72) Inventors: Takashi Matsumoto, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 251 days.

(21) Appl. No.: 18/002,813

(22) PCT Filed: Jun. 29, 2021

(86) PCT No.: PCT/JP2021/024494
§ 371 (c)(1),
(2) Date: Dec. 21, 2022

(87) PCT Pub. No.: WO2022/004705
PCT Pub. Date: Jan. 6, 2022

(65) Prior Publication Data
US 2023/0244220 A1    Aug. 3, 2023

(30) Foreign Application Priority Data
Jul. 3, 2020   (JP) ................. 2020-115468

(51) Int. Cl.
*G05B 19/409* (2006.01)
*G05B 19/42* (2006.01)
*G06F 3/04847* (2022.01)

(52) U.S. Cl.
CPC ........... *G05B 19/42* (2013.01); *G05B 19/409* (2013.01); *G06F 3/04847* (2013.01)

(58) Field of Classification Search
CPC .... G05B 19/42; G05B 19/409; G06F 3/04847
See application file for complete search history.

(56) References Cited

U.S. PATENT DOCUMENTS 6,772,046 B1 *   8/2004   Lee .................. H01L 21/67276
                                                              700/214
2005/0278068 A1 * 12/2005  Hong ....................... G06T 7/70
                                                              700/259

(Continued)

FOREIGN PATENT DOCUMENTS

CA    20 2005 021 492 U1    5/2008
JP       109-297611 A      11/1997

(Continued)

OTHER PUBLICATIONS

International Search Report issued in PCT/JP2021/024494; mailed Sep. 14, 2021.

*Primary Examiner* — Yuzhen Shen
(74) *Attorney, Agent, or Firm* — Studebaker Brackett PLLC (57) ABSTRACT

The purpose of the present invention is to obtain an manipulation feeling and improve ease of use in a teaching device for industrial machines, including robots and machine tools, in order to accurately designate a manipulation amount without performing manipulation by an erroneous manipulation amount during display of a rotary dial on a touch-panel-equipped device and during control of machinery. This purpose can be achieved by a touch-panel-type teaching device, wherein a rotary dial to which graduations are applied with respect to prescribed manipulation rotation amounts is displayed on a touch-panel-type display screen, an operation amount for the industrial machinery is designated by the rotation manipulation amount of the rotary dial, and a sound effect or vibration is emitted each time the (Continued)

rotary dial is rotationally manipulated by a rotation amount corresponding to one graduation.

10 Claims, 5 Drawing Sheets

(56) References Cited

U.S. PATENT DOCUMENTS

| | | | |
|---|---|---|---|
| 2006/0026535 A1* | 2/2006 | Hotelling | G06F 3/0488 |
| | | | 715/863 |
| 2016/0306352 A1* | 10/2016 | Chang | G06F 3/0362 |
| 2019/0009181 A1* | 1/2019 | Kroyan | A63H 11/00 |
| 2023/0225580 A1* | 7/2023 | Jang | G05D 1/027 |
| | | | 15/319 |

FOREIGN PATENT DOCUMENTS

| | | |
|---|---|---|
| JP | 2012-066322 A | 4/2012 |
| JP | 2017-049699 A | 3/2017 |
| JP | 2018-022438 A | 2/2018 |
| JP | 2019-028769 A | 2/2019 |
| JP | 2019-058963 A | 4/2019 |

\* cited by examiner

TEACHING DEVICE AND NON-TRANSITORY COMPUTER-READABLE MEDIUM STORING A COMPUTER PROGRAM

TECHNICAL FIELD

The present invention pertains to a teaching device and a non-transitory computer-readable medium storing a computer program for various types of manipulation processing devices, and particularly pertains to a teaching device and a non-transitory computer-readable medium storing a computer program for performing manipulations on a touch panel.

BACKGROUND ART

Conventionally, in a case of controlling a robot, a dedicated teaching control panel has been used to perform manual control. In contrast, for a machine tool, a means for performing manual control an accordance with a rotary dial device (manual pulse generator) is used, and a rotary dial device has also been introduced in a method of controlling a robot. A rotary dial device enables an operation amount for a machine to be designated in units of one graduation, and thus has a merit in that a fine positioning control is easy to perform. In addition, a method of using a tablet, etc. as a teaching control panel for a robot, and controlling the robot based on information displayed on a display screen has also been proposed (Patent Document 1).

Patent Document 1: Japanese Unexamined Patent Application, Publication No. H9-297611

DISCLOSURE OF THE INVENTION

Problems to be Solved by the Invention

At present, the aforementioned rotary dial device is for the most part not equipped on a control panel as a teaching device for a robot, and thus needs to be separately prepared. In addition, a means for controlling a robot by displaying a rotary dial on a touch-panel-equipped device such as a tablet can also be considered. However, because manipulating a rotary dial after displaying the rotary dial on such a touch-panel-equipped device is manipulation with respect to a screen, a manipulation feeling for a rotary dial device cannot be achieved, and thus the possibility of mistakenly designating a manipulation amount arises. This disadvantage is not limited to a teaching device for a robot, and a disadvantage similarly arises also for a teaching device for another industrial machine such as a machine tool.

Accordingly, when controlling a machine by displaying a rotary dial on a touch-panel-equipped device, in a teaching device for an industrial machine including robots and machine tools, there is a requirement to improve ease of use by achieving a manipulation feeling in order to accurately designate a manipulation amount without manipulating by an erroneous manipulation amount.

Means for Solving the Problems

In order to solve the problems described above, a teaching device according to the present disclosure is provided with a touch-panel-type display screen configured to be an input interface for an industrial machine, the teaching device including: a rotary dial display section configured to display a rotary dial on the touch-panel-type display screen, the rotary dial being able to be rotationally manipulated by an operator and having graduations corresponding to a rotational manipulation amount; a rotational manipulation amount obtainment section configured to obtain a rotational manipulation amount by which the operator rotationally manipulated the rotary dial; an operation amount designation section configured to designate an operation amount for the industrial machine in accordance with the rotational manipulation amount for the rotary dial; and a sound effect or vibration emitting section configured to emit a sound effect or vibration each time the rotary dial is rotationally manipulated by a rotational manipulation amount corresponding to one graduation.

Effects of the Invention

By virtue of a teaching device according to the present disclosure, a sound effect or a vibration is emitted each time a rotary dial is rotationally manipulated by a rotation amount corresponding to one graduation of the rotary dial, and thus an operator can acquire, as a manipulation feeling, by how many graduations the operator has manipulated the rotary dial. Accordingly, it is possible to avoid misrecognition of a manipulation amount due to a manipulation feeling not being acquired, and a teaching device having improved ease of use is achieved.

PREFERRED MODE FOR CARRYING OUT THE INVENTION

Description is given below in detail regarding an embodiment according to the present disclosure, with reference to the drawings.

Figure 1:
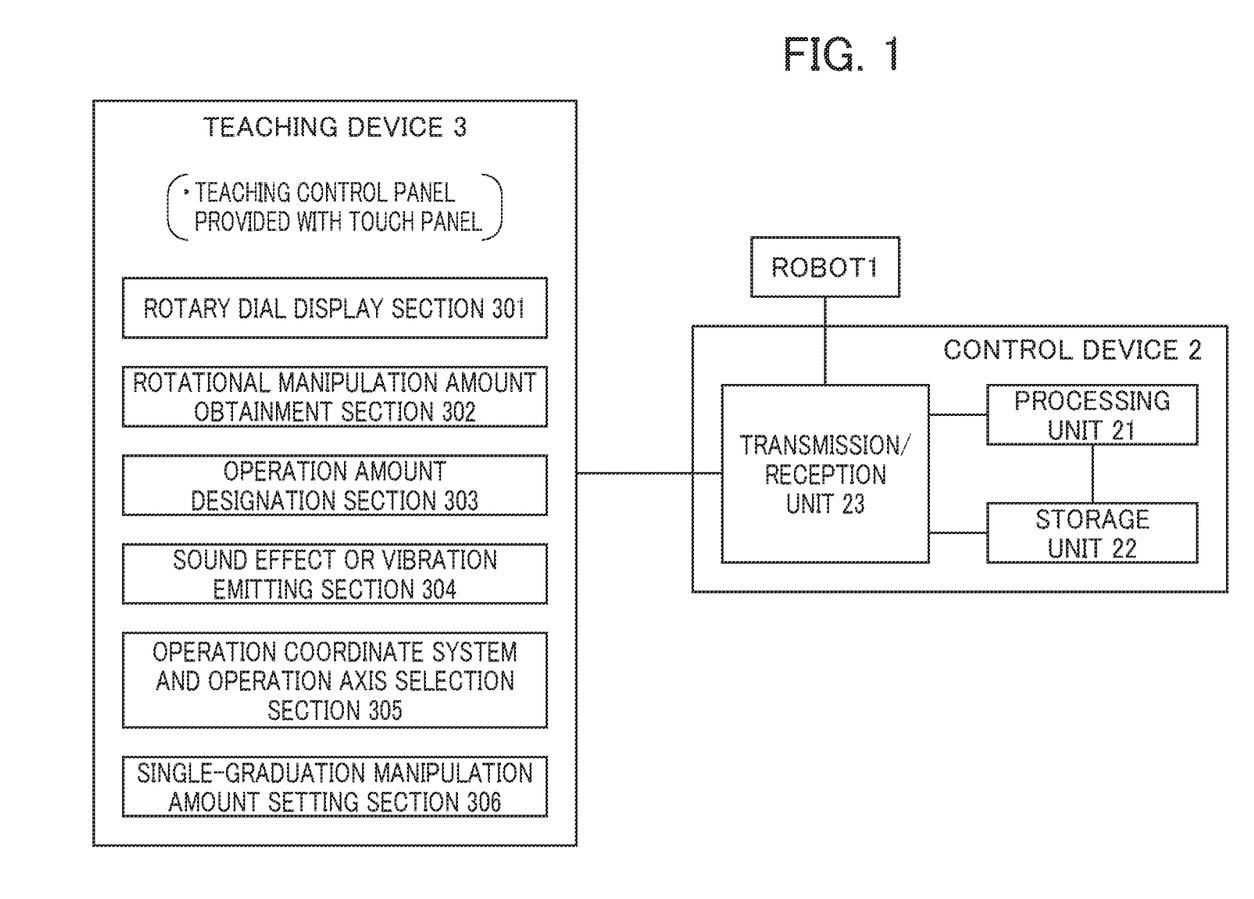
FIG. 1 is a block diagram that illustrates a relationship between a robot, a control device, and a teaching device, according to one embodiment.

FIG. 1 is a block diagram illustrating a relationship between a robot, a control device, and a teaching device, according to one embodiment of the present disclosure. A robot 1 in FIG. 1 is an articulated robot having an articulated arm, and is capable of orthogonal operation and rotational operation. Due to limitations on mechanical sections belonging to the robot, for each operation axis, upper limits and lower limits are respectively decided for a movement distance in orthogonal operation and a rotation angle in rotational operation, and each operation axis is operated within a certain range.

A control device 2 has, as components, a processing unit (CPU) 21 that includes a microcomputer, etc.; a storage unit 22 that includes a memory member such as a ROM and a RAM; and a transmission/reception unit 23 that transmits and receives signals to and from the robot 1 and a teaching device 3. The teaching device 3 is a teaching control panel provided with a touch panel, and, based on an input by an operator from the touch panel, transmits a teaching signal for an operation by the robot 1 to the control device 2. The teaching device 3 is provided with a rotary dial display section 301, a rotational manipulation amount obtainment section 302, an operation amount designation section 303, a sound effect or vibration emitting section 304, an operation coordinate system and operation axis selection section 305, and a single-graduation manipulation amount setting section 306.

Figure 2:
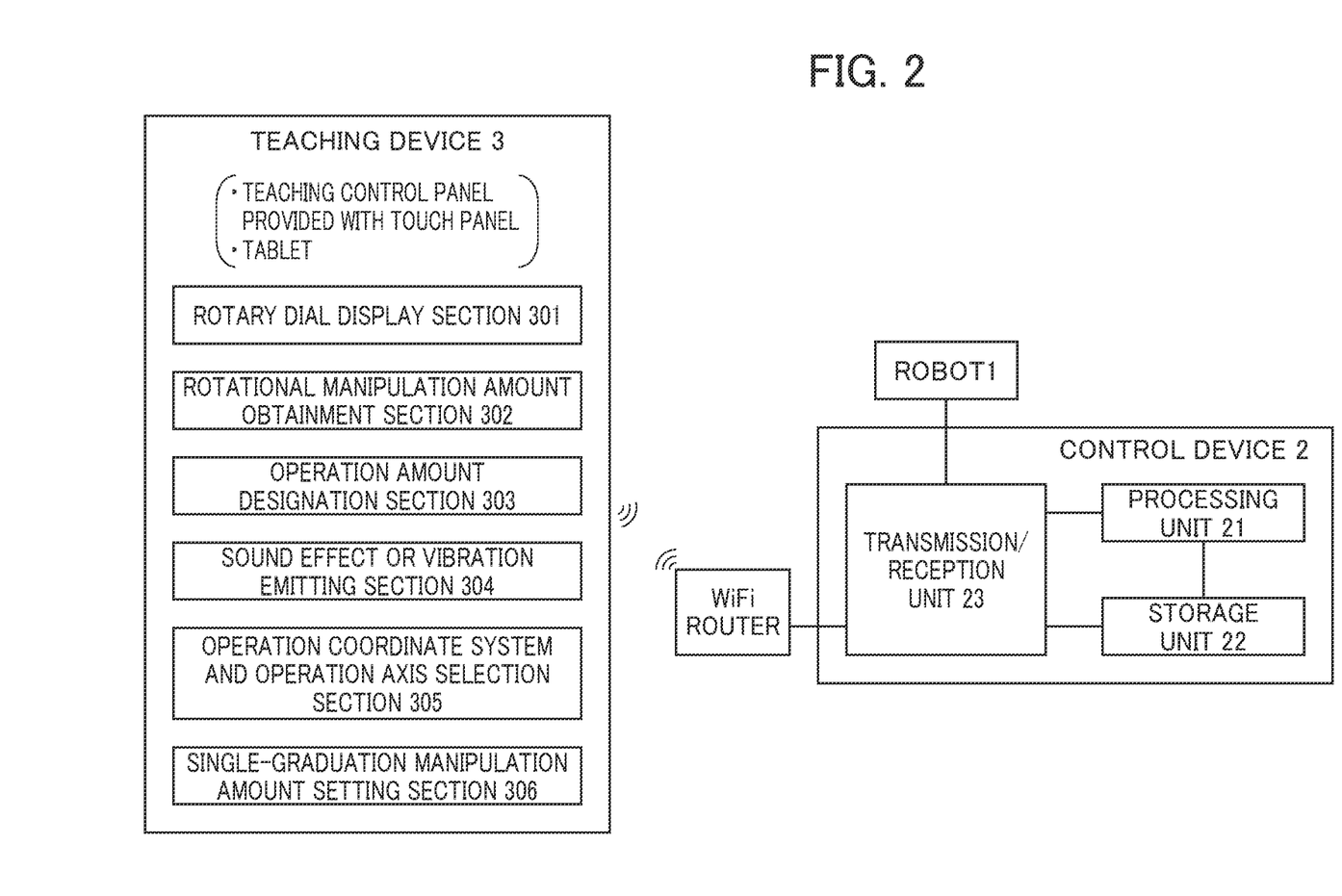
FIG. 2 is a block diagram that illustrates a relationship between a robot, a control device, and a teaching device, according to another embodiment.

FIG. 2 is a block diagram illustrating a relationship between a robot, a control device, and a teaching device, according to another embodiment of the present disclosure. A difference between the embodiment in FIG. 2 and the embodiment in FIG. 1 is that the teaching device 3 is connected by wire to the control device 2 in FIG. 1, whereas the teaching device 3 is wirelessly connected to the control device 2 in FIG. 2. Accordingly, in the embodiment in FIG. 2, the teaching device 3 is not limited to a teaching control panel provided with a touch panel, and may be a tablet. A Wi-Fi router for wirelessly communicating with the teaching device 3 is connected to the control device 2. The control device 2 and the teaching device 3 are wirelessly connected, whereby an operator can operate the teaching device 3 at a position separated from the robot 1 or the control device 2, and a degree of freedom pertaining to a manipulation position for the operator increases.

Figure 3:
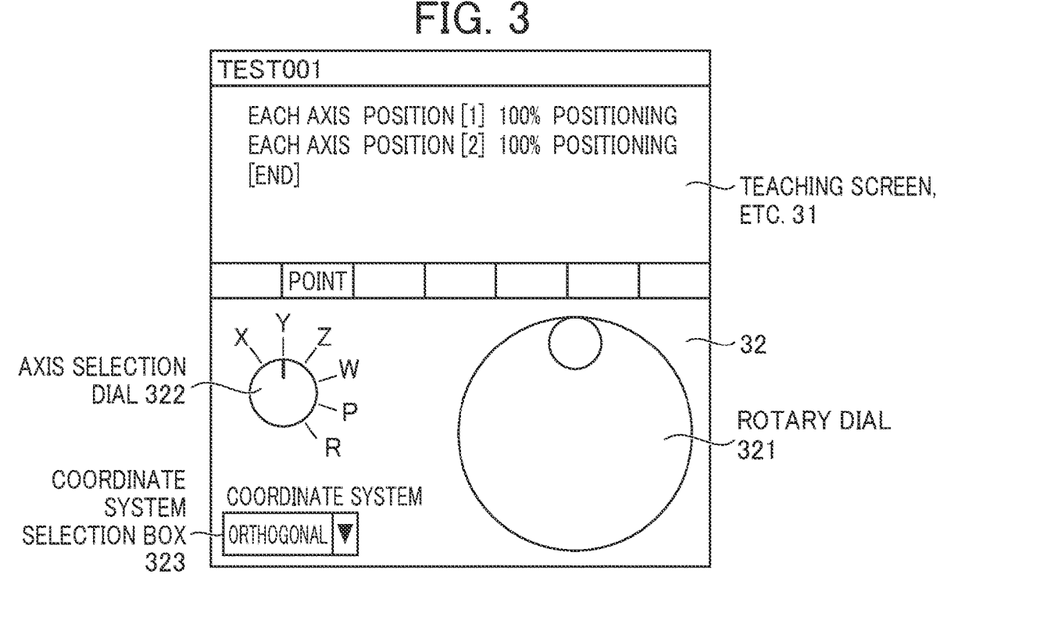
FIG. 3 is a view that illustrates one embodiment regarding a display screen for a teaching device.

FIG. 3 is a view that illustrates one embodiment regarding a display screen for the teaching device 3. When broadly divided, the display screen for the teaching device 3 includes a teaching screen 31 and a control screen 32. Details and text regarding an axis selected in regard to the operation by the robot 1, a result of operation by the robot 1, and a taught position are shown on the teaching screen 31. The control screen 32 is disposed below the teaching screen 31. The rotary dial display section 301 displays a rotary dial 321 in the control screen 32. In addition, an axis selection dial 322 and a coordinate system selection box 323 are set and displayed in the control screen 32.

The rotary dial 321 is a means for causing the robot 1 to operate in a direction of a selected axis in a coordinate system selected by the operation coordinate system and operation axis selection section 305, by way of an image of a rotary dial being caused to rotate on a display screen. From the rotational manipulation of the rotary dial and up to operation by the robot 1, there is a processing procedure in which the rotational manipulation amount obtainment section 302 obtains a rotational manipulation amount by which an operator rotationally manipulated the rotary dial, the operation amount designation section 303 designates an operation amount for the robot 1 in accordance with the obtained rotational manipulation amount, and the robot 1 is operated in accordance with the designated operation amount. The axis selection dial 322 is for an operator to select an operation axis which is to be selected by means of the operation coordinate system and operation axis selection section 305, and, in FIG. 3, is a dial-type selection means for selecting an axis from among XYZ linear movement axes and WPR rotation axes. The coordinate system selection box 323 is for an operator to select, from a pull-down menu, an operation coordinate system that is to be selected by means of the operation coordinate system and operation axis selection section 305. In an example, an orthogonal coordinate system or a rotation coordinate system is selected. As a procedure for controlling the robot 1 on the control screen 32, firstly, an orthogonal coordinate system or a rotation coordinate system is selected from the coordinate system selection box 323. Axes displayed by the axis selection dial 322 change in accordance with the selected coordinate system. Next, after the axis selection dial 322 is used to select an axis that is desired to operate, the rotary dial 321 is rotationally manipulated whereby it is possible to control the robot 1 in a direction of the selected axis.

Figure 4:
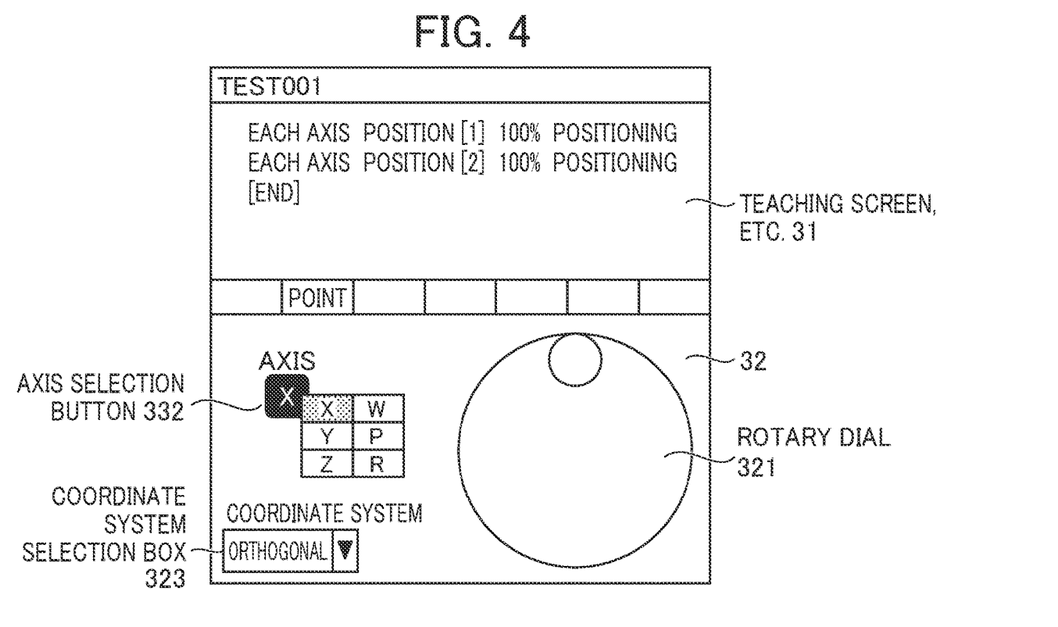
FIG. 4 is a view that illustrates another embodiment regarding a display screen for a teaching device.

FIG. 4 illustrates another embodiment regarding a display screen for the teaching device 3. A difference between the embodiment in FIG. 4 and the embodiment in FIG. 3 is that a means for selecting an axis is the axis selection dial 322 in FIG. 3, whereas the means for selecting an axis is axis selection buttons 332 in FIG. 4. The axis selection buttons 332 are where axes that can be selected are displayed when an icon for the axis selection buttons is clicked. In FIG. 4, the XYZ linear movement axes and the WPR rotation axes are displayed.

When the rotary dial 321 is rotationally manipulated, the sound effect or vibration emitting section 304 emits a sound effect or a vibration in accordance with a rotational manipulation amount. Specifically, a sound effect or a vibration is emitted each time a rotational manipulation for one graduation, which is set on the rotary dial, is performed. This is for an operator to recognize that a rotational manipulation has advanced by one graduation of the rotary dial, in accordance with an auditory or tactile manipulation feeling for the manipulation rotation amount.

In addition, the sound effect or vibration emitting section 304 emits a sound effect or a vibration while changing a pattern between a time for an orthogonal operation and a time for a rotational operation. This is for an operator to recognize whether the robot is currently operating in orthogonal operation or operating in rotational operation, in accordance with an auditory or tactile manipulation feeling.

In addition, a single-graduation manipulation amount setting section 306 that can set a manipulation amount corresponding to one graduation of the rotary dial 321 is provided, and a manipulation amount for a distance or angle corresponding to one graduation of the rotary dial 321 is set by an operator or is automatically set. The robot 1 as described above is operated by an operation amount that is within a specific range for each operation axis. In addition, the single-graduation manipulation amount setting section 306 can also automatically change the manipulation amount for one graduation on the rotary dial 321, in accordance with a difference with respect to a distance or angle for an upper limit for an operation range and the operation amount designated by the operation amount designation section. Near the upper limit for the operation range, the manipulation amount for one graduation is set to be smaller, whereby it is expected that reaching outside of the operation range will be less likely. Furthermore, it is also possible to change the manipulation amount for one graduation in accordance with a direction in which an operator manipulates the rotary dial 321. It is possible to set the manipulation amount for one graduation to lower if a manipulation direction is a direction toward an upper limit for the operation range for an operation axis for the robot 1, and set the manipulation amount for one graduation to be higher if the manipulation direction is a direction for returning from the upper limit for the operation range to an initial operation value.

In a case where it has ceased to be possible to control the robot 1 due to, for example, an abnormal state occurring for the robot 1, the rotary dial display section 301 changes a display for the rotary dial. At this time, the rotary dial display section 301 prevents rotation of the rotary dial 321.

In addition, the operation amount designation section 303 stops a command, which is due to a rotational manipulation of the rotary dial 321, from going to the robot 1. In addition, the sound effect or vibration emitting section 304 emits a sound effect or vibration that is different to that at a time of normal operation by the robot 1. The sound effect or vibration may be presented once when the abnormal state occurred, or may be constantly presented while the abnormal state is occurring. In addition, it is possible to present sound effect or vibration again in a case where there is an attempt to manipulate the rotary dial 321, whereby an operator is caused to recognize that the robot cannot be manually controlled due to the abnormal state.

While the robot 1 is automatically operating, it is not possible to control the robot 1 by rotationally manipulating the rotary dial 321. The rotary dial display section 301 changes the rotary dial 321 to a display different to a normal one, and prevents rotation of the rotary dial 321 even if an operator attempts to manipulate the rotary dial 321. The operation amount designation section 303 stops a command due to a rotational manipulation of the rotary dial 321 from going to the robot 1. In addition, in a case where there is an attempt to manipulate the rotary dial 321, the sound effect or vibration emitting section 304 emits a sound effect or vibration which is for during automatic operation and is different to that for a time of normal operation by the robot 1.

In the teaching device 3 according to the present disclosure, the teaching screen 31 and the control screen 32 are simultaneously displayed on a display screen. By simultaneously displaying the teaching screen 31 and the control screen 32, it is possible to use the rotary dial 321 to control the robot 1 and perform position teaching without switching screens.

Figure 5:
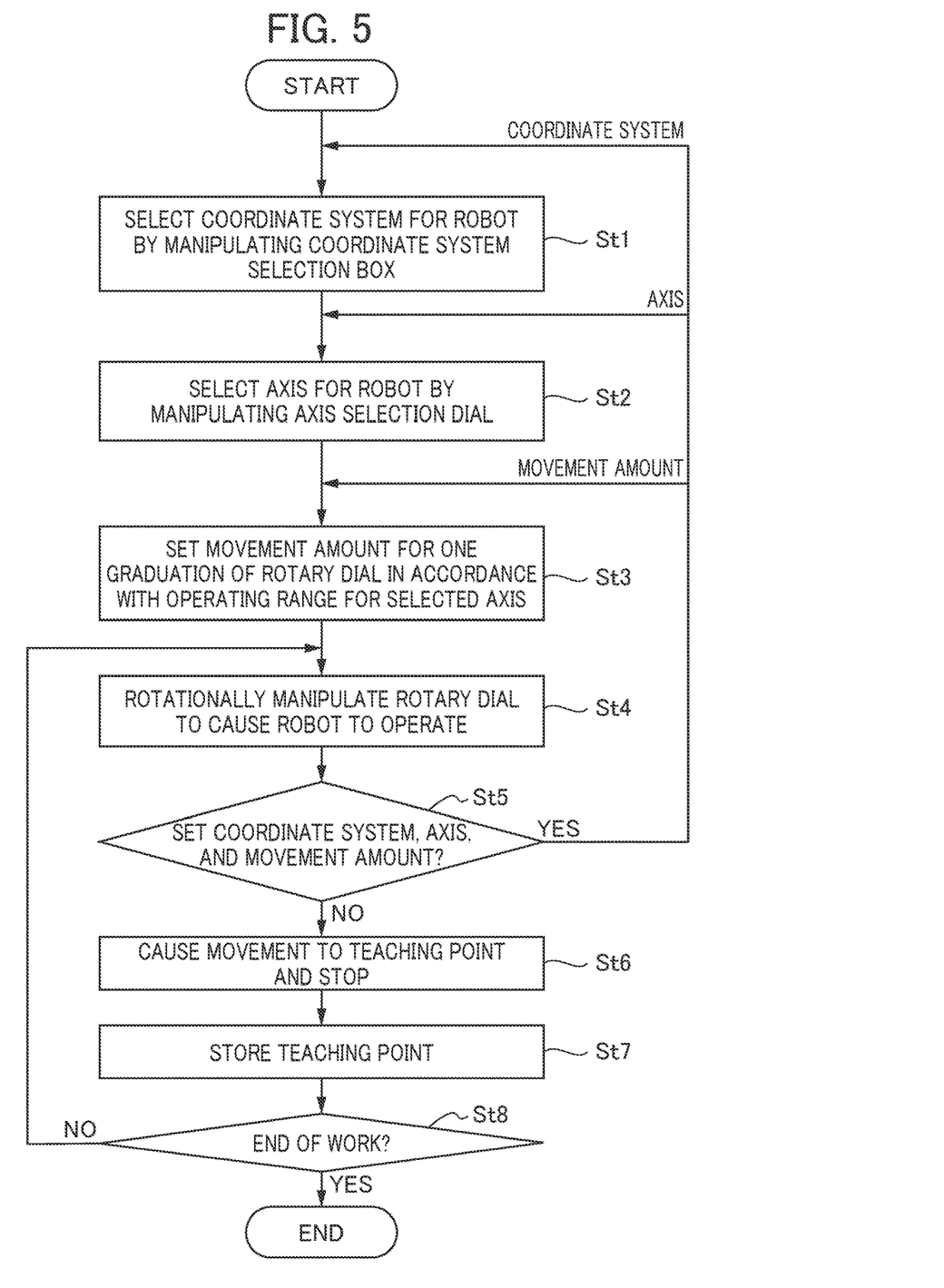
FIG. 5 is a flow chart that illustrates a procedure for robot control in accordance with the teaching device in the present disclosure.

Next, a procedure for teaching control for the robot 1 in accordance with the teaching device 3 according to the present disclosure is described by a flow chart in FIG. 5. As illustrated in FIG. 5, firstly, an operator selects, by manipulating the coordinate system selection box 323 in the control screen 32 in the teaching device 3, a coordinate system for the robot 1, and the coordinate system for the robot 1 is selected by the operation coordinate system and operation axis selection section 305 (Step St1). Next, the operator selects, by manipulating the axis selection dial 322 (or axis selection buttons 332), an operation axis for the robot 1, and the operation axis for the robot 1 is selected by the operation coordinate system and operation axis selection section 305 (Step St2).

Next, in the single-graduation manipulation amount setting section 306, a manipulation amount for one graduation in the rotary dial is set in accordance with an operation range for the selected axis (Step St3). At this time, the manipulation amount for one graduation is set smaller near an upper limit for an operation range, as described above. As a result, there is an expectation that reaching outside of the operation range will be less likely. Furthermore, it is possible to set the manipulation amount for one graduation to be lower if a manipulation direction is a direction toward an upper limit for the operation range for an operation axis for the robot 1, and set the manipulation amount for one graduation to be higher if the manipulation direction is a direction for returning from the upper limit for the operation range to an initial operation value.

After the setting in Step St1 to Step St3 has ended, the rotary dial 321, which is displayed by the rotary dial display section 301, is rotationally manipulated, and a rotational manipulation amount is obtained by the rotational manipulation amount obtainment section 302. In this rotational manipulation of the rotary dial 321, the sound effect or vibration emitting section 304 emits a sound effect or vibration each time the rotational manipulation amount reaches one graduation on the rotary dial 321. The operation amount designation section 303 designates an operation amount for the robot from the rotational manipulation amount, and causes the robot 1 to actually operate in accordance with the designated operation amount (Step St4). At this time, when an amount of movement in a direction toward an upper limit for the operation range is set smaller in Step St3, it becomes easier to finely adjust a position for movement in a direction toward the upper limit for the operation range.

In order to cause the robot 1 to move to a teaching point, it is necessary to perform a manipulation while changing a coordinate system/axis/movement amount. Accordingly, while causing the robot 1 to move by rotationally manipulating the rotary dial 321, a determination is made as to whether it is necessary to set a coordinate system/axis/movement amount (Step St5). In a case where a result of the determination in Step St5 is YES—in other words in a case where a need to change one of a coordinate system/axis/movement amount arises while rotationally manipulating the rotary dial 321, the rotational manipulation of the rotary dial 321 is stopped, a respective one of Step St1, Step St2, and Step St3 is returned to in accordance with whether the need to make a setting arose for a coordinate system, axis, or movement amount, and the change is performed. Step St4 is returned to and the robot is caused to move by manipulating the rotary dial 321 with the newly set coordinate system/axis/movement amount set in the respective step.

Next, when the robot 1 has reached the teaching point, the rotary dial 321 is stopped, and the robot 1 is caused to stop (Step St6). The current position of the robot 1 at that time is stored in a robot program as the teaching point (Step St7). By repeating Step St1 through Step St7, it is possible to store a plurality of teaching points in the robot program.

Next, a determination is made as to whether work in accordance with operation by the robot 1 is complete (Step St8). In a case where a result of the determination in Step St8 is YES—in other words in a case where work in accordance with operation by the robot 1 is complete, all steps for the work end, and this flow ends. In a case where the result of the determination in Step St8 is NO—in other words in a case where work in accordance with operation by the robot 1 is not complete and is continued, Step St4 is returned to, and the rotary dial 321 is manipulated to thereby cause the robot to move.

Figure 6:
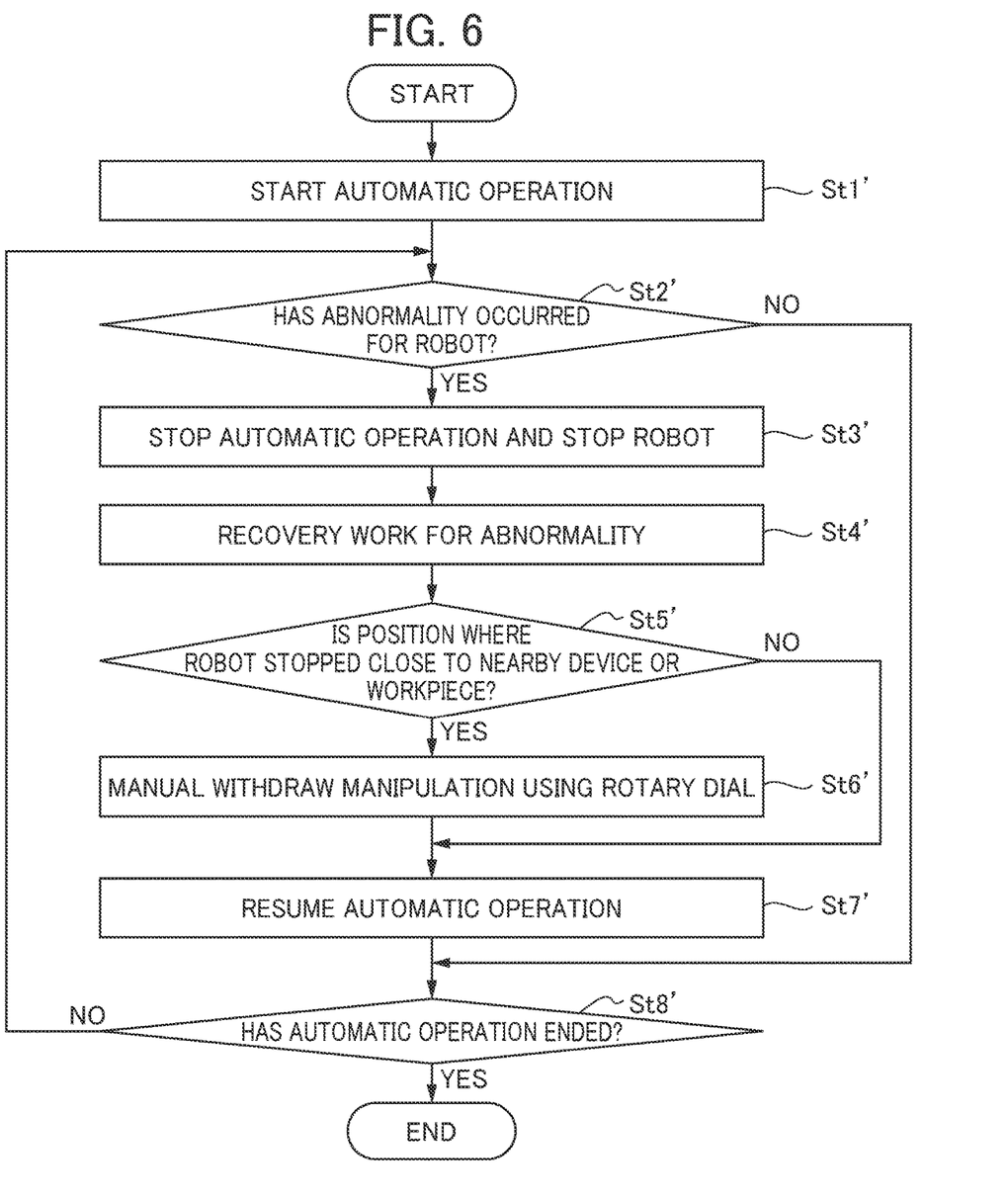
FIG. 6 is a flow chart that illustrates another embodiment regarding a procedure for robot control in accordance with the teaching device according to the present disclosure.

Next, a procedure for a performing restoration work by the rotary dial 321 when an abnormality has occurred in automatic operation by the robot 1 in the present disclosure is described by a flow chart in FIG. 6. As illustrated in FIG. 6, there is a beginning with the start of automatic operation (Step St1'). After the start of the automatic operation, the rotary dial 321 changes to a different color to that at a time of normal operation, and it ceases to be possible to manipulate the rotary dial 321. In addition, when there is an attempt to manipulate the rotary dial 321, a sound effect or vibration different to a time of normal operation is emitted. Next, a determination is made regarding whether an abnormality has occurred for the robot 1 (Step St2'). In a case where a result of the determination is NO—in other words in a case where an abnormality has not occurred, the automatic operation progresses, and Step St8' is transitioned to.

In a case where the result of the determination in Step St2' is YES—in other words in a case where an abnormality has occurred, automatic operation by the robot 1 is stopped, and the robot 1 stops (Step St3'). In addition, in this case, the rotary dial 321 changes to a different color to that at a time of normal operation, and it ceases to be possible to manipulate the rotary dial 321. In addition, while the abnormality is occurring or when there is an attempt to manipulate the rotary dial 321, a sound effect or vibration different to a time of normal operation is emitted. Next, an operator confirms details regarding an abnormality alarm, performs recovery work regarding the abnormality, and eliminates a cause for the abnormality (Step St4'). When the factor for the abnormality is eliminated, the color for the rotary dial 321 as well as the sound effect or vibration are returned to that for a normal time, and it becomes possible to use the rotary dial 321 to control the robot 1.

Next, an operator determines whether the robot 1 will interfere with a workpiece or a nearby device when automatic operation by the robot 1 resumes (Step St5'). In a case where a result of the determination is YES—in other words in a case where it is possible for the robot 1 to interfere with a workpiece or a nearby device, the rotary dial 321 is turned to cause the robot 1 to withdraw (Step St6'). Subsequently, automatic operation by the robot 1 is resumed (Step St7'). After resuming, similarly to after St1', the color of the rotary dial 321 changes, it ceases to be possible to manipulate the rotary dial 321, and a sound effect or vibration different to that at a time of normal operation is emitted when the rotary dial 321 is attempted to be manipulated. A determination is made whether to end automatic operation by the robot 1 (Step St8'). If a result of the determination is YES, automatic operation by the robot 1 ends, and this flow ends. If a result of the determination is NO, the automatic operation by the robot 1 is continued, and Step St2' is returned to. A loop of from Step St2' to Step St8' is repeated until it is determined that the automatic operation has ended in Step St8'.

Next, description is given regarding an effect by the teaching device according to an invention according to the present disclosure. Firstly, a basic effect that indicates a feature that is central to a teaching device according to the present disclosure is, as described above, because a sound effect or vibration is emitted each time a rotary dial is rotationally manipulated by a rotation amount for one graduation of the rotary dial, an operator can acquire, as a manipulation feeling, by how many graduations the rotary dial was manipulated, and thus it is possible to avoid a manipulation amount misrecognition that arises due to a manipulation feeling not being acquired.

In addition, in a case where a robot performs both of orthogonal operation and rotational operation in accordance with a rotational manipulation for a teaching device as with the teaching device according to the present disclosure, when both operations are repeatedly performed while changing from orthogonal operation for the robot to rotational operation or from rotational operation to orthogonal operation, at present it is difficult to recognize which operating state the robot is in, and thus there is the possibility of incorrect operation. In the teaching device according to the present disclosure, a sound effect or vibration is emitted while changing a pattern between a time for orthogonal operation and a time for rotational operation, and thus an operator can presently use an auditory or tactile manipulation feeling to recognize whether the robot is operating by orthogonal operation or operating by rotational operation. Accordingly, it is possible to avoid incorrect operation due to misrecognition in relation to the operating state of a robot, and it is possible to improve ease of use.

In addition, in the teaching device according to the present disclosure, it is possible to automatically change the manipulation amount for one graduation on the rotary dial, in accordance with a difference with respect to a distance or angle for an upper limit for an operation range. Accordingly, it is also possible to set the manipulation amount for one graduation to be lower if a manipulation direction is a direction toward an upper limit for the operation range for an operation axis, and set the manipulation amount for one graduation to be higher if the manipulation direction is a direction for returning from the upper limit for the operation range to an initial operation value. By setting in this manner, reaching outside of the operation range becomes less likely, it is possible to avoid an incorrect operation by manipulating outside of the operation range, and, because it is possible to return from close to outside of the operation range toward the reverse direction at a normal speed, it is possible achieve high ease of use from the perspective of manipulation speed as well.

In addition, for the teaching device according to the present disclosure, in a case where an abnormal state has occurred for a robot, the display for the rotary dial is changed and commands to the robot in accordance with the rotary dial being rotationally manipulated are stopped, or a sound effect or vibration different to that for normal operation by the robot is emitted while the abnormal state is occurring or in a case where there is an attempt to manipulate the rotary dial, and thus an operator can quickly notice the abnormal state and avoid continuing the manipulation while the abnormal state remains. As a result, it is possible to avoid continuing wasteful manipulation, and it is also possible to prevent the robot from being damaged due to manipulation continuing while the abnormal state remains.

In addition, even in the case where automatic operation by the robot is underway, the display for the rotary dial is changed, and a command to the robot due to the rotary dial being rotationally manipulated is stopped. In addition, in a case where there is an attempt to manipulate the rotary dial, because a sound effect or vibration different to that for when the robot is normally operating is emitted, an operator can notice that the robot is automatically operating and can avoid attempting to continue manipulation while the automatic operation is underway.

In addition, for a teaching device according to the present disclosure, by simultaneously displaying a teaching screen and a control screen, it is possible to use the rotary dial to control the robot and perform position teaching without switching screens. Therefore, it is possible to perform control while recognizing the position teaching and it is possible to improve ease of use and prevent incorrect operation.

In relation to working the present invention, description is given above regarding embodiments, but the present invention is not limited whatsoever to these embodiments. For example, description was given by embodiments for a robot, but it goes without saying that the present invention can be worked in various aspects within a scope that does not deviate from the spirit of the present invention, such that the present invention can also be applied to an embodiment for another industrial machine including various types of machine tools.

EXPLANATION OF REFERENCE NUMERALS

1 Robot
2 Control device
21 Processing unit
22 Storage unit

23 Transmission/reception unit
3 Teaching device
301 Rotary dial display section
302 Rotational manipulation amount obtainment section
303 Operation amount designation section
304 Sound effect or vibration emitting section
305 Operation coordinate system and operation axis selection section
306 Single-graduation manipulation amount setting section
31 Teaching screen
32 Control screen
321 Rotary dial
322 Axis selection dial
323 Coordinate system selection box
332 Axis selection button

The invention claimed is:

1. A teaching device provided with a touch-panel-type display screen configured to be an input interface for an industrial machine, the teaching device comprising a processor, the processor being configured to:
   display a rotary dial on the touch-panel-type display screen, the rotary dial being able to be rotationally manipulated by an operator and having graduations corresponding to a rotational manipulation amount;
   obtain a rotational manipulation amount by which the operator rotationally manipulated the rotary dial;
   designate an operation amount for the industrial machine in accordance with the rotational manipulation amount for the rotary dial;
   emit a sound effect or vibration each time the rotary dial is rotationally manipulated by a rotational manipulation amount corresponding to one graduation; and
   select, on the touch-panel-type display screen, an operation coordinate system and an operation axis for the industrial machine, the industrial machine being a control target for the rotary dial,
   wherein a sound effect or a vibration pattern presented by the processor differs between an orthogonal operation and a rotational operation according to linear movement axes of an orthogonal coordinate system or rotation axes of a rotational coordinate system selected by the processor.

2. The teaching device according to claim 1, wherein
   in a case where it is not possible to operate the industrial machine in a state where the industrial machine is automatically operating or an abnormal situation is occurring,
   the processor changes a display for the rotary dial,
   designation of an operation to the industrial machine in accordance with the rotary dial being rotationally manipulated is stopped by the processor, and
   the processor emits a sound effect or vibration different to a sound effect or vibration for a normal time.

3. The teaching device according to claim 1, wherein a teaching screen is simultaneously displayed, together with a control screen that includes the rotary dial, on the touch-panel-type display screen.

4. The teaching device according to claim 1, wherein the industrial machine is a robot.

5. A teaching device provided with a touch-panel-type display screen configured to be an input interface for an industrial machine, the teaching device comprising a processor, the processor being configured to:
   display a rotary dial on the touch-panel-type display screen, the rotary dial being able to be rotationally manipulated by an operator and having graduations corresponding to a rotational manipulation amount;
   obtain a rotational manipulation amount by which the operator rotationally manipulated the rotary dial;
   designate an operation amount for the industrial machine in accordance with the rotational manipulation amount for the rotary dial;
   emit a sound effect or vibration each time the rotary dial is rotationally manipulated by a rotational manipulation amount corresponding to one graduation; and
   set a manipulation amount corresponding to one graduation of the rotary dial,
   wherein the processor obtains a rotational manipulation amount corresponding to a distance or angle in excess of an operation range for the industrial machine, and
   the processor automatically changes, in accordance with a difference between a distance or angle for an upper limit for the operation range and the operation amount designated by the processor, the rotational manipulation amount for one graduation of the rotary dial, and
   sets the manipulation amount for one graduation to a lower amount if a manipulation direction is a direction toward an upper limit for an operation range for an operation axis, and sets the manipulation amount for one graduation to be a higher amount if the manipulation direction is a direction for returning from the upper limit for the operation range to an initial operation value.

6. A non-transitory computer-readable medium storing a computer program for teaching teaching content inputted from a touch-panel-type display screen to an industrial machine,
   the computer program causing a computer to execute:
   a rotary dial display process for displaying a rotary dial on the touch-panel-type display screen, the rotary dial being able to be rotationally manipulated by an operator and having graduations corresponding to a rotational manipulation amount;
   a rotational manipulation amount obtainment process for obtaining a rotational manipulation amount by which the operator rotationally manipulated the rotary dial;
   an operation amount designation process for designating an operation amount for the industrial machine in accordance with the rotational manipulation amount for the rotary dial; and
   a sound effect or vibration emitting process for emitting a sound effect or vibration each time the rotary dial is rotationally manipulated by a rotational manipulation amount corresponding to one graduation,
   wherein
   the computer program causes the computer to execute a selection process for selecting, on the touch-panel-type display screen, an operation coordinate system and an operation axis for the industrial machine, the industrial machine being a control target for the rotary dial, and
   a sound effect or a vibration pattern presented in the sound effect or vibration emitting process differs between an orthogonal operation and a rotational operation according to linear movement axes of an orthogonal coordinate system or rotation axes of a rotational coordinate system selected in the selection process.

7. The non-transitory computer-readable medium storing the computer program according to claim 6, wherein
   in a case where the industrial machine is automatically operating or an abnormal situation is occurring and it is not possible to operate the industrial machine, the rotary dial display process changes a display for the rotary dial, designation of an operation to the industrial machine in accordance with the rotary dial being rotationally manipulated is stopped in the operation amount designation process, and the sound effect or vibration emitting process emits a sound effect or vibration different to a sound effect or vibration for a normal time.

8. The non-transitory computer-readable medium storing the computer program according to claim 6, wherein the computer program causes the computer to execute a process for simultaneously displaying a teaching screen, together with a control screen that includes the rotary dial, on the touch-panel-type display screen.

9. The non-transitory computer-readable medium storing the computer program according to claim 6, wherein the industrial machine is a robot.

10. A non-transitory computer-readable medium storing a computer program for teaching teaching content inputted from a touch-panel-type display screen to an industrial machine, the computer program causing a computer to execute:

a rotary dial display process for displaying a rotary dial on the touch-panel-type display screen, the rotary dial being able to be rotationally manipulated by an operator and having graduations corresponding to a rotational manipulation amount;

a rotational manipulation amount obtainment process for obtaining a rotational manipulation amount by which the operator rotationally manipulated the rotary dial;

an operation amount designation process for designating an operation amount for the industrial machine in accordance with the rotational manipulation amount for the rotary dial; and a sound effect or vibration emitting process for emitting a sound effect or vibration each time the rotary dial is rotationally manipulated by a rotational manipulation amount corresponding to one graduation, wherein the computer program causes the computer to execute a single-graduation manipulation amount setting process that can set a manipulation amount corresponding to one graduation of the rotary dial, the rotational manipulation amount obtainment process obtains a rotational manipulation amount corresponding to a distance or angle in excess of an operation range for the industrial machine, and the single-graduation manipulation amount setting process changes, in accordance with a difference between a distance or angle for an upper limit for the operation range and a distance or angle for the operation amount designated in the operation amount designation process, the rotational manipulation amount for one graduation of the rotary dial, and sets the manipulation amount for one graduation to a lower amount if a manipulation direction is a direction toward an upper limit for the operation range for an operation axis, and sets the manipulation amount for one graduation to be a higher amount if the manipulation direction is a direction for returning from the upper limit for the operation range to an initial operation value.

* * * * *